United States Patent Office

3,472,661
Patented Oct. 14, 1969

3,472,661
PROCESS FOR PREPARING LIQUID MARGARINE
Daniel Melnick, West Englewood, and Edmund L. Josefowicz, Bayonne, N.J., assignors to Corn Products Company, New York, N.Y., a corporation of Delaware
No Drawing. Filed Oct. 21, 1966, Ser. No. 588,295
Int. Cl. A23d 3/02
U.S. Cl. 99—123       10 Claims

ABSTRACT OF THE DISCLOSURE

A stable liquid margarine is prepared as follows. The fat phase is prepared by blending a liquid vegetable oil, a thickening agent, an emulsifier and a phosphatide, chilling the blend to a point at which it partially crystallizes, holding the resultant partially crystallized blend in a quiescent state for at least five hours, and then vigorously agitating the blend to obtain uniform dispersion of the fat crystals. The aqueous phase is then added to the fat phase, both phases being maintained at approximately the same temperature during the addition. The temperature of the resultant emulsion is reduced to about 20° F. to about 40° F., after which the emulsion is vigorously whipped and finally packaged.

---

This invention relates to the preparation of margarines which are in stable liquid form at both room temperatures (about 70–95° F.) and refrigerator temperatures (about 40–45° F.). More specifically, the invention relates to the preparation of base fats for use in the preparation of such margarines, and to the process whereby a satisfactory margarine is formed.

Margarine which is in the form of a liquid, and is therefore pourable, at both room temperatures and refrigerator temperatures is extremely useful to both the homemaker and the commercial margarine user. It is difficult, however, to prepare a margarine emulsion which will remain liquid at different room temperatures and refrigerator temperatures (as well as at intermediate temperatures) and which will be stable (i.e., the fat and aqueous phases will not separate) for any appreciable period of time.

Margarines are water-in oil (more properly water-in-fat) emulsions. The oil phase has a specific gravity of about 0.92 while the aqueous phase, usually a salted skim milk, has a specific gravity of about 1.00 to 1.25 depending upon salt concentration. Water and oil do not mix, but separate readily from each other. Emulsifiers as used in conventional margarines permit the preparation of emulsions which hold together for a short period (a matter of minutes) until the fat phase is solidified in the chilling operation. A stable water-in-solid fat emulsion is then produced. However, such a stable emulsion is not pourable at room temperature and certainly not at refrigeration temperatures. Warming such margarines to liquify the fat promptly breaks the emulsion and separation into the two phases occurs.

It is an object of this invention to prepare a base liquid fat which is suitable for the preparation of stable, pourable margarines.

A further object of the invention is to prepare margarines which are liquid, and therefore pourable, at both room temperature and at refrigerator temperature.

Another object of the invention is to prepare liquid margarines which are pourable and stable for at least one week at the usual room temperatures and at least two weeks or considerably longer at refrigerator temperatures and which regain original emulsion uniformity after several inversions of the containers holding the liquid margarines.

Other objects and advantages of the invention will appear hereinafter from the specification and from the recitals of the appended claims.

In order to prepare a satisfactory base fat, for use in the preparation of a liquid margarine, in accordance with the present invention, the following four ingredients are included: (1) edible liquid vegetable oil, (2) a thickening agent, (3) an emulsifier, and (4) a vegetable phosphatide. Ingredients (2) to (4) are all soluble or readily dispersible in the edible oil.

The liquid oil comprises about 90% to about 98% by weight of the total base fat. It can be any edible vegetable seed oil which is liquid or pourable after having been held 24 hours at 45° F. and then stirred at that temperature, or a blend of two or more of such oils.

An essential feature of our invention is that the base fat separated from our novel margarines (after heating at 160° F.) must have Solid Content Index (S.C.I.) values within the following ranges: from about 1.5 to about 4.0 at 50° F.; from about 1.5 to about 4.0 at 70° F.; from about 1.5 to about 3.5 at 80° F.; from about 1.0 to about 3.0 at 92° F. For this test, the dilatometric method as described by Fulton and associates (J.A.O.C.S. 31, 98, 1954) is usually employed for obtaining the S.C.I. values and has been used in the course of the present investigations.

The thickening agent is a high melting edible fat, and is present in an amount which provides S.C.I. values within the aforementioned ranges. Hard fats, e.g., hydrogenated vegetable or animal fats or hydrogenated vegetable stearines or the like, which are solid at temperatures above 120° F. are employed as thickening agents either singly or in combinations. The thickening agent is usually present in an amount of from about 1.5% to about 5% by weight of the total base fat. The purpose of the thickening agent is twofold: (1) it adds body to the fat phase and, consequently, to the final margarine; (2) it acts synergistically with the emulsifier in forming the emulsion and maintaining emulsion stability (without one or the other, emulsion instability results). The thickening agent has an iodine value consistent with its desired melting point which is within the range of 125° F. to 160° F. (Wiley) and preferably about 135° F. to 150° F.

The emulsifier is a partial fatty acid ester of glycerine, preferably one predominantly of the monoglyceride type or a combination of two or more monoglycerides, (with or without diglycerides) and preferably has an iodine value of about 0.5 to 100.0 and preferably of about 1 to 85. Distilled monoglycerides of high melting point and low iodine value, either alone or in combination with diglycerides (viz., commercial grades of so-called glycerol monostearate presently on the market) are preferred emulsifiers. In such cases the melting points are usually about 145° F. to 160° F. and the iodine values are from about 0.5 to 5.0. The emulsifier is present in an amount of from about 0.1% to about 0.5% by weight of the total base fat.

The vegetable oil phosphatide (e.g., lecithin) is present in an amount of from about 0.1% to about 0.5% by weight of the total base fat.

Additional materials such as coloring agents (e.g., carotene) and vitamins, which are customarily used in margarines, may also be added.

The process for making the base fat comprises the following three steps:

(1) First a blend of the four essential ingredients, plus any additional ingredients such as carotene, vitamins, or the like, is prepared. This blend can be prepared in any suitable manner, the only requirement being that the ingredients be thoroughly blended. Hence, heating the base fat or preferably a portion thereof, to a temperature of about 150°–160° F. for complete solution or dispersion of the additives in the vegetable seed oil is required.

(2) Next the blend is partially crystallized. This is accomplished by chilling with agitation the blend to a lower temperature ranging from about 20° F. to about 60° F., preferably about 40° F. to about 50° F. This step can be suitably performed in a scraped-surface heat exchanger. After this step the blend has the appearance of a cloudy slurry.

(3) The third step comprises holding the resultant slurry in a quiescent state for a period of at least 5 hours and preferably 10 to 16 hours. The holding step can be performed at either the lower crystallization temperature or, as the blend attains ambient temperature during storage, at room temperature.

After the expiration of the holding period, the specially processed fat is subjected to vigorous agitation for several minutes to assure uniformity of the dispersion of the fat crystals and is then ready to be mixed with the aqueous phase for the production of the final margarine. It should be noted that it is not necessary to add the aqueous phase immediately after the holding period; the base fat can be held for an indefinite period of time, providing care is taken not to redissolve the crystals that had formed. We shall now describe the process of making a stable, liquid margarine using our novel base fat as the fat phase.

The aqueous phase employed can be any aqueous material conventionally used in the preparation of margarine, such as pasteurized skim milk plus minor amounts of flavoring materials, salt (if desired), preservatives, etc. As is the case in conventional margarines, the proportions used are at least 80% fat phase, the remaining being the aqueous phase. Conventional equipment can be employed in the manufacture of the margarine, provided it is used under specific controlled conditions to be described hereinafter.

It is desirable that the aqueous and the agitated fat phases be at the same temperature when the aqueous phase is added to and then mixed with the fat phase; care is exercised not to dissolve the solid crystalline material in the fat phase. Therefore, if the base fat has been held at the crystallization temperature, say about 45° F., the aqueous phase should preferably be brought to a temeprature of about 45° F. prior to the mixing of the two phases. If, on the other hand, the fat phase has been held at ambient temperature and has reached about 70° F., the aqueous phase may then be at about 70° F. when the two are mixed.

An important requirement in the process of preparing the margarine is the use of very vigorous agitation when and after bringing the two phases together. Usually about five minutes of vigorous agitation is adequate to form the emulsion.

Next, the temperature of the emulsion is reduced to from about 20° F. to about 40° F., by passing it through a heat exchanger of the type mentioned above.

It must then be thoroughly worked, or whipped, in order to finely disperse the solid fat materials, that had crystallized out of solution, and the aqueous phase. Our preferred method for performing this step is to pass the emulsion, at a temperature of about 20° F. to about 40° F., through a working unit such as a Votator Whipping Unit or similar equipment. The product is agitated in the whipping unit containing stationary metal fingers and rotating metal fingers on a shaft revolving at about 500 r.p.m. to about 1300 r.p.m.; the fluid emulsion issues from the working unit at a temperature of about 40° F. to about 70° F., after a 4 to 6 minute residence time in the whipping unit. Thus, the extent of blending is determined by the extent of temperature increase due to heat of friction and other factors.

The product so formed is then ready for packaging. It is a stable emulsion (little or no separation occurs from up to 7 days at room temperature or up to two weeks or longer at refrigerator temperature), and is liquid and freely pourable at both room temperature and refrigerator temperatures.

We do not know all the changes attending the special processing of the fat phase of our novel margarines. Whatever the mechanisms may be, we have found the long holding period following crystallization to be essential to the production of a stable liquid margarine emulsion. Subjecting a freshly prepared whole margarine emulsion to the decribed processing steps, using the same fat phase in the margarine emulsion, will not give a stable liquid margarine; the base fat phase itself must be individually processed and held as described for attaining the products of the present invention.

The following examples will illustrate the practice of the invention. They are presented for illustrative purposes only and should not be considered as limiting the scope of the invention in any way. All references to parts and percentages are by weight unless expressly stated to be otherwise.

EXAMPLE I

A blend was first prepared of 46.12 parts of liquid soybean oil and 50.62 parts of liquid corn oil. A small portion of the blend was transferred to another container, and 3.75 parts of hydrogenated soybean stearine (melting point about 145° F., iodine value 20 to 25) was added to this portion. This mixture was heated to melt the soybean stearine, and then added to the liquid oil blend.

In a like manner, 0.16 part of a commercially available emulsifier comprising distilled monoglycerides of hydrogenated cottonseed stearine was melted and added to the blend. The emulsifier contained 90% monoglycerides by weight, had a melting point of about 155° F. and an iodine value of about 3. Then 0.16 part of a commercial soybean oil lecithin was added.

The resultant blend of fatty materials was then chilled in a scraped surface heat exchanger, and recycled to the feed tank, until cooled to about 40° F. The resultant partially crystallized slurry was then removed from the heat exchanger and permitted to stand, in a quiescent state, at room temperature (65–70° F.) for about 10 hours.

An aqueous phase was prepared by blending together the following ingredients: pasteurized skim milk, salt, preservatives and flavoring materials.

To 80 parts of the fat phase, conditioned as described above, and now thoroughly mixed to gain uniformity, 20 parts of the aqueous phase was gradually added (both phases being at a temperature of about 65–70° F.) with vigorous agitation. The agitation was continued for about five minutes after the addition of the aqueous phase. During this period of agitation, there was no substantial rise in temperature of the mixture.

The emulsion was then chilled to about 20° F. and passed through a Votator Whipping Unit where it was agitated at 800 r.p.m. with recycling until the product issuing from the whipping unit was about 65° F. The residence time in this whipping unit was 4 minutes.

The resultant product remained pourable at both 75° F. and 45° F. No oil separation was observed after 7 days storage at 75° F. and after 14 days storage at 45° F. After 10 days at 75° F., there was slight oil separation, but a few inversions of the container were adequate to re-establish a uniform emulsion. The S.C.I. values of the separated oil, obtained after heating the margarine and holding it at 160° F., were 3.4 at 50° F., 3.2 at 70° F., 3.0 at 80° F. and 2.7 at 92° F.

EXAMPLE II

Example I was repeated with the following variation:
(A) The liquid oil blend consisted of 48.35 parts of liquid soybean oil and 48.35 parts of liquid corn oil.
(B) Three parts of hydrogenated soybean stearine were added.

(C) In place of the emulsifying agent described in Example I there was used 0.15 part of a soft distilled monoglyceride, also 90% monoglyceride, but from refined cottonseed oil. It had an iodine value of 8.5.
(D) 0.15 part commercial soybean oil lecithin was used.
(E) The fat phase was chilled to about 40° for the crystallization step, after which it was held at room temperature for about 16 hours.

The resultant product was pourable at both 75° F. and 45° F. No oil separation occurred during 7 days storage at 75° F. or during 14 days at 45° F. After 10 days storage at 75° F., slight oil separation was noted, but a few inversions of the container re-established uniformity of the emulsion. The S.C.I. values of the separated oil were 2.4 at 50° F., 2.0 at 70° F., 1.8 at 80° F. and 1.3 at 92° F.

EXAMPLE III

The same base fat and the same aqueous phase as in Example I were used. The blend was chilled to about 45° F. with agitation; after the crystals had formed the slurry was held at 45° F., without further agitation, for 16 hours.

The aqueous phase was chilled to about 45° F., and the two phases were mixed together with agitation as described in Example I.

The emulsion was then chilled to about 20° F. and passed through the working unit which was set at 800 r.p.m. The emulsion issued at a temperature of about 50° F. Residence time in the whipping unit was now 3 minutes.

The product was pourable at both 75° F. and 45° F. After three days storage at 75° F. a few drops of oil appeared on the surface, but no significant oil separation could be observed until after 7 days. No separation occurred during 14 days storage at 45° F. Simple inversion of the container several times was adequate to restore emulsion uniformity when some separation occurred at 75° F.

EXAMPLE IV

In this example the amount of lecithin was increased to near the upper limit of about 0.5% by weight of the total base fat.

Example I was repeated with the following variation:
(A) The liquid oil blend consisted of 48.5 parts of soybean oil and 48.5 parts cottonseed oil (3.0 parts of hydrogenated soybean stearine of 145° F. melting point was added as heretofore).
(B) The emulsifier consisted of 0.30 part of the commerical monoglyceride prepared from unhydrogenated refined cottonseed oil.
(C) 0.48 part lecithin was used.

After processing, the resultant product was pourable at both 75° F. and 45° F. No significant oil separation occurred during 7 days storage at 75° F. or during 14 days at 45° F.

EXAMPLE V

Example I was repeated except the liquid oil portion of the oil-blend consisted of 97 parts liquid corn oil and 3.75 parts of hydrogenated corn oil, of 140° F. melting point and of 20 iodine value, served as the thickening agent. The S.C.I. values of the oil separated from the margarine were the same as in Example I.

The product remained pourable liquid at both 75° F. and 45° F., without oil separation as in Example I.

EXAMPLE VI

This example illustrates the importance of holding the crystallized fat phase for about at least 5 hours.

The fat phase was prepared as in Example IV and was crystallized as in Example I, but the holding time was limited to approximately 3 hours. After this time the temperature of the fat phase had reached 52° F. The aqueous phase was cooled to 52° F., then was immediately added to the fat phase, with vigorous agitation for five minutes. The emulsion was then cooled in the heat exchanger to 20° F. and whipped at 800 r.p.m. Residence time in the whipping unit was 3 minutes. The product, which issued at 55°–60° F., was then packaged. The product separated into two gross and distinctive phases after 24 hours at 75° F. This was not a satisfactory product; it could not be made homogeneous by inversions of the containers.

EXAMPLE VII

This example illustrates the importance of the crystallization step conducted on the fat phase alone.

A blend of 48.5 parts liquid soybean oil, 48.5 parts liquid cottonseed oil and 3.0 parts of hydrogenated soybean stearine (145° F. melting point) was used. The added emulsifier and vegetable phosphatide were also the same in identity and amount as in Example IV. The fat phase was not prechilled, and there was no holding period. To the fat phase at 110° F. was added the aqueous phase, the mixture was agitated vigorously for five minutes, and then immediately cooled in the heat exchanger to about 20° F. The cooled emulsion was then agitated in the whipping unit during a 3 minute residence time and the final product at 50° F. was packaged. The product became solid and non-pourable at 75° F. but remained pourable at 45° F. However, free oil developed at each temperature after 24 hours storage. This free oil could not be properly re-emulsified with shaking of the container. This was not a satisfactory product.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. Process for preparing a pourable stable margarine comprising the following steps:
   (A) preparing a fat phase in the following manner:
      (1) preparing a blend of:
         (a) edible liquid vegetable seed oil,
         (b) a thickening agent which is a fat with a melting point in excess of 120° F.,
         (c) an emulsifier which is a partial fatty acid ester of glycerine,
      said edible liquid oil being present in an amount of from about 90% to about 98% by weight, the proportion of thickening agent being such that the base fat separated from the margarine will have S.C.I. values within the following ranges:
         from about 1.5 to about 4.0 at 50° F.
         from about 1.5 to about 4.0 at 70° F.
         from about 1.5 to about 3.5 at 80° F.
         from about 1.0 to about 3.0 at 92° F.
      said emulsifier being present in an amount of from about 0.1% to about 0.5% by weight of the base fat and said vegetable phosphatide being present in an amount of from about 0.1% to about 0.5% by weight of the base fat;
      (2) chilling said blend to a temperature of about 20° F. to about 60° F. whereby said blend partially crystallizes;
      (3) holding the resultant partially crystallized blend in a quiescent state for a period of at least five hours at a temperature at which the crystalline fat does not dissolve, and then
      (4) attaining through vigorous agitation uniformity of dispersion of the fat crystals,

(B) adding an aqueous phase to said fat phase, while both phases are at approximately the same temperature;

(C) reducing the temperature of the resultant emulsion to from about 20° F. to about 40° F., and (D) subjecting the emulsion to vigorous whipping, whereby the solid fat materials present in said emulsion and the aqueous phase are finely dispersed, and the temperature of said emulsion rises to from about 40° F. to about 70° F., and then packaging the emulsion.

2. Process in accordance with claim 1 wherein said thickening agent is selected from the group consisting of hydrogenated vegetable fats, hydrogenated vegetable stearines, animal fats which are solid at temperatures above 120° F., and mixtures thereof.

3. Process in accordance with claim 1 wherein said emulsifier is predominantly monoglycerides having an iodine value from about 0.5 to 100.

4. Process in accordance with claim 1 wherein said emulsifier comprises a monoglyceride product having an iodine value of from about 0.5 to about 5.0 and a melting point of about 145° to 160° F.

5. Process in accordance with claim 1 wherein said vegetable phosphatide comprises lecithin.

6. Process in accordance with claim 1 wherein said blend is chilled to a temperature of about 40° F. to about 50° F.

7. Process in accordance with claim 1 wherein said partially crystallized blend is held in a quiescent state at the same temperature at which it was crystallized.

8. Process in accordance with claim 1 wherein said partially crystallized blend is held in a quiescent state at ambient room temperature.

9. Process in accordance with claim 7 wherein said aqueous phase is chilled, prior to the addition of same to said fat phase, to the same temperature as that of said fat phase, whereby both phases are at approximately the same temperature during said addition.

10. Process in accordance with claim 8 wherein said aqueous phase, prior to the addition of same to said fat phase, is brought to the same temperature as that of said fat phase, whereby both phases are at approximately the same temperature during said addition.

References Cited
UNITED STATES PATENTS

| | | | |
|---|---|---|---|
| 3,011,896 | 12/1961 | Eber et al. | 99—118 |
| 3,338,720 | 8/1967 | Pichel | 99—122 X |
| 3,397,998 | 8/1968 | Fricks | 99—123 |

MAURICE W. GREENSTEIN, Primary Examiner

U.S. Cl. X.R.

99—122